F. A. RODDY.
APPARATUS FOR ILLUSTRATING AND DEMONSTRATING THE PRINCIPLES OF PURE ARITHMETIC.
APPLICATION FILED APR. 20, 1918.

1,372,087.  Patented Mar. 22, 1921.
3 SHEETS—SHEET 1.

F. A. RODDY.
APPARATUS FOR ILLUSTRATING AND DEMONSTRATING THE PRINCIPLES OF PURE ARITHMETIC.
APPLICATION FILED APR. 20, 1918.
1,372,087.
Patented Mar. 22, 1921.
3 SHEETS—SHEET 2.
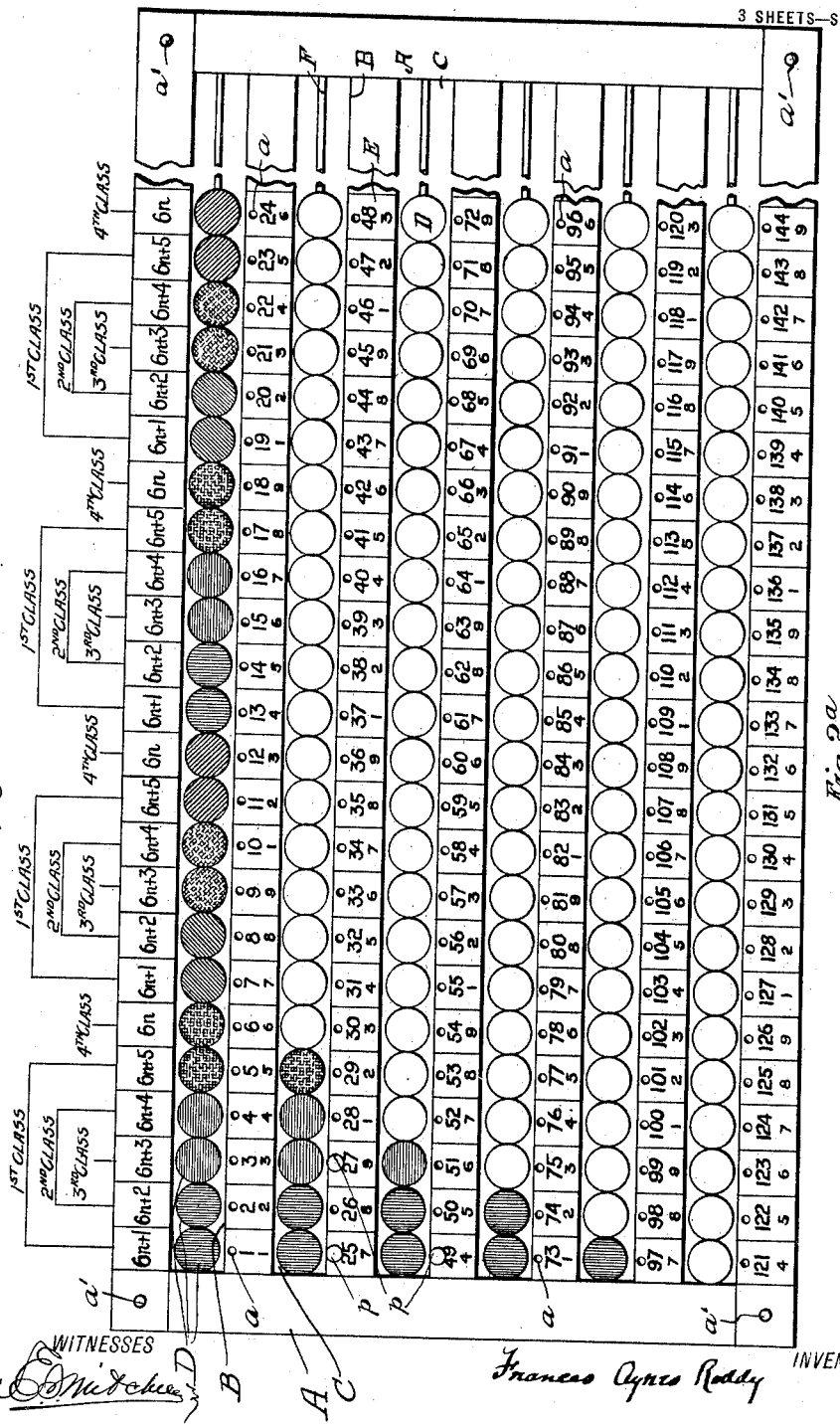
Fig. 2.
Fig. 2ª

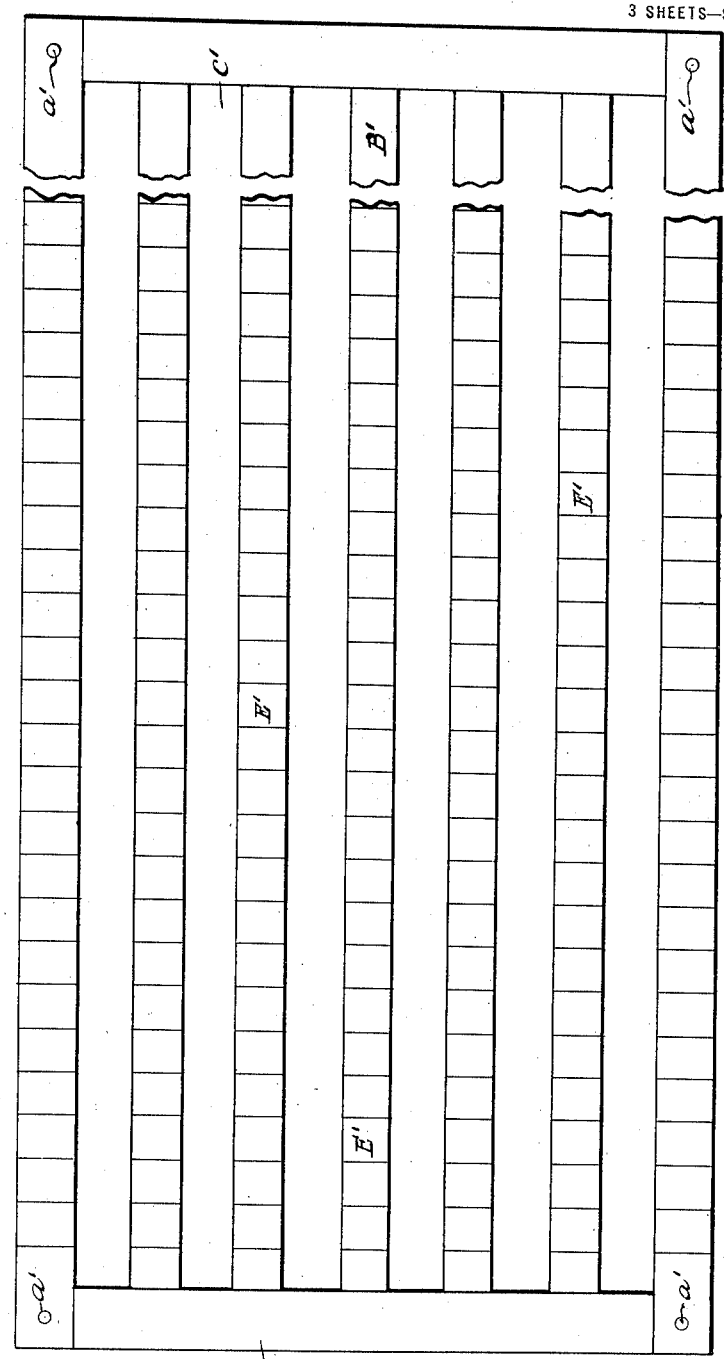

UNITED STATES PATENT OFFICE.

FRANCES AYRES RODDY, OF NEW YORK, N. Y.

APPARATUS FOR ILLUSTRATING AND DEMONSTRATING THE PRINCIPLES OF PURE ARITHMETIC.

1,372,087.      Specification of Letters Patent.      Patented Mar. 22, 1921.

Application filed April 20, 1918. Serial No. 229,775.

*To all whom it may concern:*

Be it known that I, FRANCES AYRES RODDY, of New York, New York, have invented an Apparatus for Illustrating and Demonstrating the Principles of Pure Arithmetic, of which the following description, in connection with the accompanying drawings, is a specification, like characters on the drawings designating like parts.

My invention relates to a number table, that is to say, an apparatus by which various properties of numbers may be illustrated and taught in a very simple, original, and vivid manner. More particularly, my number table is an apparatus for illustrating and demonstrating the principles which underlie the composition and divisibility of numbers, or the principles of pure arithmetic.

A satisfactory and preferred form of my apparatus is shown in the accompanying drawings, in which—

Figure 1 is a front view of the apparatus showing the structure of the double-duodecimal table made visible to the eye in the arrangement of the colored unit balls D, also the process of forming numbers out of their prime constants, or "prime factors" as they are commonly called. The divisors of every number are denoted by the small figures under the number and within the same unit square E.

Fig. 1ª is a diagrammatic view of the arrangement of complementary divisors on an enlarged scale which could not be shown clearly in Fig. 1.

Fig. 2 is a view of the reverse side of the apparatus, showing the arrangement of the four classes of numbers in the double-duodecimal table and the formulæ $6n+1$, $6n+2$, $6n+3$, $6n+4$, $6n+5$, $6n$, under which they are contained.

The small figure under each number denotes the sum of its digits.

A hole $a$ in which one of the kindergarten pegs is inserted when required, is seen above each number and within the same unit square.

Fig. 2ª shows a kindergarten peg, lettered "$p$."

Fig. 3 is a view of the adjustable slate which is adapted to be used with the apparatus shown in Figs. 1 and 2. This slate consists of parallel horizontal bars B'. Each bar has a silicate surface and is ruled in twenty-four squares E', the same as the bars of the double-duodecimal table.

This slate is used for teaching and illustrating the principles of pure arithmetic as set forth in the annexed specifications. When it is required, it is suspended over the double-duodecimal table and fastened by pegs $p$ inserted through registering holes $a'$ in the respective corners of the slate and table.

According to the preferred embodiment of my invention, the apparatus comprises a frame A provided with alternately arranged bars B and slots C. Each bar B is ruled in 24 squares E on which are placed appropriate numerals or other indicia to be hereinafter referred to. The squares E on the bars of the table and the squares E' on the bars of the slate are of the same area. Every slot C contains strung on the rods F twenty-four balls or counters D arranged to register with the squares E' of the slate, which, as shown in Fig. 3, is composed of the frame A', the bars B' and the slots C'. The side of the unit square and the diameter of the unit ball or counter are the same and serve as a linear unit in measuring, comparing, combining and separating numbers.

*How I use the double-duodecimal table in teaching beginners.*

In my double-duodecimal table the forms of all numbers with regard to 24 (the base of the table) and with regard to every exact divisor of 24 are vividly illustrated by means of colored balls D. There are twenty-four in each row sliding on a horizontal rod F. They are arranged to register with the series of squares E in which are inscribed the figures which show the number of units each number contains. When the balls in each row are moved to the left, the first ball is opposite 1, the second opposite 2, the third opposite 3, the fourth opposite 4, and so on.

The side of the unit square and the diameter of the unit ball thus serve as linear units in measuring and comparing numbers, fractional parts, lines, &c.

PERFECT NUMBER PICTURES.

The balls D in each row represent the six standard colors; red, blue, yellow, purple, orange and green. They are arranged as follows: two red, two blue, two yellow, two purple, two orange, and two green; and when they are all moved to the left as far as possible, we have a vivid picture of odd and even numbers, with the exact number of 2's in every even number, and the exact number of 2's plus 1 in every odd number illustrated in contrasting colors. Thus, The number 2 is pictured by two red balls.

The 2 and 1 in the number 3 are pictured by the two red balls and the one blue ball.

The two 2's in 4 are pictured by two red balls and two blue balls.

The two 2's and 1 in 5 are pictured by two red, two blue balls and one yellow ball.

The three 2's in 6 are pictured by two red, two blue and two yellow balls.

The three 2's and 1 in 7 are pictured by two red, two blue, two yellow, and one purple ball; and so on.

Since this arrangement of these colored balls shows the exact number of 2's in every even number and the exact number of 2's plus 1 in every odd number, it is obvious that it must afford the perfect picture of every number with all its integral parts, whether addends or divisors, vividly pictured in contrasting colors.

Odd numbers stand in the first column and every second column after the first.

Even numbers stand in the second column and every second column after the second.

*The structure of the double-duodecimal table and how it is illustrated by the arrangement of the colored balls.*

In the double-duodecimal table there are twenty-four numbers in each row; hence, there are twenty-four vertical columns, and all numbers that stand in the same column are of the same form with regard to 24; that is, when divided by 24, they will all yield the same remainder.

Every number greater than 24 is either exactly divisible by 24 or when the division is carried as far as possible there will be a remainder of 1, 2, 3, 4, 5, 6, 7, 8, 9, 10, 11, 12, 13, 14, 15, 16, 17, 18, 19, 20, 21, 22 or 23.

All numbers exactly divisible by 24 stand in the twenty-fourth column. When a number is not exactly divisible by 24 the remainder will be the first number of the column in which it stands. If the number stands in the first column the remainder will be 1; if it stands in the second column the remainder will be 2; if it stands in the third column the remainder will be 3; and so on.

All remainders are pictured in the arrangement of the colored balls.

When the remainder is 1 we have one red ball, when it is 2 we have two red balls, when it is 3 we have two red balls and one blue ball, when it is 4 we have two red balls and two blue balls; and so on.

THE FORMS OF ALL NUMBERS WITH REGARD TO EVERY EXACT DIVISOR OF 24.

The divisors of 24 are 1, 2, 3, 4, 6, 8, 12 and 24.

Since all numbers of the same form with regard to 24 stand in the same column, all numbers of the same form with regard to any divisor of 24 must stand in the same column or columns.

If the first number of any column is a multiple of 2, every number is a multiple of 2.

If a multiple of 3, every number is a multiple of 3.

Similarly, if the first number of any column is a multiple of 4, 6, 8 or 12, every number in the column is a multiple respectively of 4, 6, 8 or 12.

The multiples of 2 are the numbers in the 2d, 4th, 6th, 8th, 10th, 12th, 14th, 16th, 18th, 20th, 22nd and 24th vertical columns.

The multiples of 3 are the numbers in the 3rd, 6th, 9th, 12th, 15th, 18th, 21st and 24th columns, and similarly the multiples of 4, 6, 8 and 12 are the numbers in those columns which are respectively the 4th, 6th, 8th and 12th columns.

When the unit balls are all moved to the left as far as possible, we have a vivid picture of the arrangement of the columns containing the multiples of each divisor of 24.

When a number is a multiple of 2, the two right hand balls are either red, blue, yellow, purple, orange or green.

When a number is a multiple of 4 or 8, the two right hand balls are blue, purple or green.

When a number is a multiple of 6, the two right hand balls are yellow or green.

When a number is a multiple of 12 or 24, the two right hand balls are green.

When a multiple of 3 is an odd number, the right hand ball is either blue or orange; and when it is an even number, the two right hand balls are either yellow or green.

When the first number of any column is not divisible by a given divisor of 24, the remainder will be the same as the remainder which every number of that column will yield when divided by that divisor.

For example, 3 is 1 more than 2; therefore, every number in the third column divided by 2 will leave a remainder 1; 5 is 2 more than 3; therefore, every number in the fifth column divided by 3 will leave a remainder of 2; 7 is 3 more than 4; therefore, every number in the seventh column divided by 4 will leave a remainder of 3; 7 is 1 more than 6; therefore, every number in the seventh column divided by 6 will leave a remainder 1.

When the first number in any column is less than a given divisor of 24, it will be the remainder which every other number in the column will yield when divided by that divisor.

For example: 1 is less than 2; therefore, every number after 1 in the first column divided by 2 will yield a remainder 1; 2 is less than 3; therefore, every number after 2 in the second column divided by 3 will yield a remainder 2; 3 is less than 4; therefore, every number after 3 in the third column divided by 4 will yield a remainder 3.

When any number is not divisible by 2, there will be a remainder 1; when it is not divisible by 3, there will be a remainder 1 or 2; when it is not divisible by 4, there will be a remainder 1, 2 or 3; when it is not divisible by 6, there will be a remainder 1, 2, 3, 4, or 5; when it is not divisible by 8, there will be a remainder 1, 2, 3, 4, 5, 6 or 7; when it is not divisible by 12, there will be a remainder 1, 2, 3, 4, 5, 6, 7, 8, 9, 10 or 11.

*The arrangement of the columns containing the odd and the even multiples of every exact divisor of 24.*

An odd multiple of a number is one that contains it an odd number of times and an even multiple is one that contains it an even number of times.

*Illustrations.*

2 6 10 are odd multiples of 2.
4 8 12 are even multiples of 2.
12 36 60 are odd multiples of 12.
24 48 72 are even multiples of 12.

The number 24 contains 2, 3, 4, 6 and 12 an even number of times; therefore, the odd and even multiples of these divisors are distinguished by the columns in which they stand. If the first number of any column is an odd multiple of 2, all the numbers are odd multiples of 2; if the first number is an even multiple of 2, all the numbers are even multiples of 2; if the first number is an odd multiple of 3, all the numbers are odd multiples of 3; if the first number is an even multiple of 3, all the numbers are even multiples of 3; and so on.

When the unit balls in each row are moved to the left as far as possible, the arrangement of the odd and even multiples of 2, 3, 4, 6 and 12 is vividly pictured in the contrasting colors.

The unit balls in each row are so arranged that the lighter colors—red, yellow and orange—alternate with the darker colors—blue, purple and green. Thus, Red Blue Yellow Purple Orange Green Red Blue Yellow Purple Orange Green When a number is an odd multiple of 2, the two right hand balls are one of the lighter colors, either red, yellow or orange; and when it is an even multiple of 2, or a multiple of 4, the two right hand balls are one of the darker colors, either blue, purple or green.

When a number is an odd multiple of 6, the two right hand balls are yellow and when it is an even multiple of 6 or a multiple of 12, the two right hand balls are green.

When a number is an odd multiple of 3, the right hand ball is either blue or orange, and when it is an even multiple of 3, or a multiple of 6, the two right hand balls are yellow or green.

When a number is a multiple of 12, the two right hand balls are green.

*Principle: An odd multiple of any number is not divisible by an even multiple of that number.*

The arrangement of the columns containing the odd and even multiples of 2 and 4 show that an odd multiple of 2 cannot be divided by 4, and an odd multiple of 4 cannot be divided by 8.

The arrangement of the columns containing the odd and even multiples of 3, 6 and 12, show that an odd multiple of 3 cannot be divided by 6, an odd multiple of 6 cannot be divided by 12, and an odd multiple of 12 cannot be divided by 24.

*How the names of the numbers in each column are memorized.*

The numbers in every column of the double-duodecimal table form an arithmetical progression in which the common difference is 24; that is, every number is 24 more than the preceding number. The numbers in any column can be called up quickly by adding the number of the column to the successive multiples of 24. For examples:

Starting with 1 and adding 1 to the successive multiples of 24, we have the numbers in the first column.

1 and 24 are 25
1 and 48 are 49
1 and 72 are 73
1 and 96 are 97
1 and 120 are 121
1 and 144 are 145

AN EXPLANATION OF THE ALGEBRAIC FORMULÆ ON THE MARGIN OF THE DOUBLE-DUODECIMAL TABLE AND HOW THEY ARE USED IN TEACHING THE PRINCIPLES WHICH UNDERLIE THE COMPOSITION AND DIVISIBILITY OF NUMBERS, OR THE PRINCIPLES OF PURE ARITHMETIC.

In the series of integral numbers we have an organized system of continual proportionals.

The system is of the nature of a system of measures. Four unit measures of proportion form its fundamental basis; hence, there are four distinct classes of numbers and four denominations.

The four unit measures are 1, 2, 3, and 6. 6 is the standard unit. 1, 2, and 3 are the smaller units.

The unit measure of the first class is 1.
The unit measure of the second class is 2.
The unit measure of the third class is 3.
The unit measure of the fourth class is 6.

The 1's (numbers of the first class) are the powers of 5, 7, 11 and the higher prime numbers, and the numbers in the successive geometrical progressions which are formed by multiplying together these powers.

The 2's (numbers of the second class) are the powers of 2, and the numbers in the successive geometrical progressions which are formed by multiplying together the powers of 2, and the powers of 5, 7, 11 and the higher prime numbers.

The 3's (numbers of the third class) are the powers of 3 and the numbers in the successive geometrical progressions which are formed by multiplying together the powers of 3, and the powers of 5, 7, 11 and the higher prime numbers.

The 6's (numbers of the fourth class) are the numbers in the successive geometrical progression which are formed by multiplying together the powers of 2, the powers of 3 and the powers of the higher prime numbers.

The numbers in each class are distinguished by their form with regard to 6.

*What I mean by the form of a number with regard to 6.*

Every number greater than 6 is either exactly divisible by 6, or when the division is carried on as far as possible, there will be a remainder of 1, 2, 3, 4, or 5; that is, every number whatever is of one of the forms of $6n$, $6n+1$, $6n+2$, $6n+3$, $6n+4$, $6n+5$.

When the remainder is 1, the number is contained under the formula $6n+1$.

When the remainder is 2, the number is contained under the formula $6n+2$, and so on, *i. e.* whatever the remainder may be, the number is contained under the formula $6n+$remainder unless there is no remainder, in which case the number will be contained under the formula $6n$.

The system is embodied in the formulæ $6n$, $6n+1$, $6n+2$, $6n+3$, $6n+4$, $6n+5$.

The complete development of the formulæ and the distinct properties of each class require that the series of integral numbers (1, 2, 3 . . .) be arranged in six vertical columns instead of one straight line. When this is done, we have what may be called the senary table.

In the senary table all numbers of the same form with regard to 6 stand in the same column and the key to the system is found in the disposition and arrangement of the six columns and in multiplying, dividing, adding and subtracting the formulæ.

THE SENARY TABLE.

| | 1st class. | 2d class. | | 3d class. | | 4th class. |
|---|---|---|---|---|---|---|
| | Col. I | Col. II | Col. III | Col. IV | Col. V | Col. VI |
| | $6n+1$ | $6n+2$ | $6n+3$ | $6n+4$ | $6n+5$ | $6n$ |
| 1st row | 1 | 2 | 3 | 4 | 5 | 6 |
| 2d row | 7 | 8 | 9 | 10 | 11 | 12 |
| 3d row | 13 | 14 | 15 | 16 | 17 | 18 |
| 4th row | 19 | 20 | 21 | 22 | 23 | 24 |
| 5th row | 25 | 26 | 27 | 28 | 29 | 30 |
| 6th row | 31 | 32 | 33 | 34 | 35 | 36 |
| 7th row | 37 | 38 | 39 | 40 | 41 | 42 |

*The arrangement of the four classes of numbers.*

The first class contains all odd numbers that are not measured by 3. Every number of this class is 1 more or 1 less than a multiple of 6, and is, therefore, contained under the formula $6n+1$ or $6n+5$. Those contained under the formula $6n+1$ stand in the first column; those contained under the formula $6n+5$ stand in the fifth column.

The second class contains all even numbers that are not measured by 3. Every number of this class is 2 more or 2 less than a multiple of 6, and is, therefore, contained under the formula $6n+2$ or $6n+4$. Those contained under the formula $6n+2$ stand in the second column; those contained under the formula $6n+4$ stand in the fourth column.

The third class contains all odd numbers that are measured by 3. Every number of this class is 3 more or 3 less than a multiple of 6, and is, therefore, contained under the formula $6n+3$. All numbers of this class stand in the third column.

The fourth class contains all even numbers that are measured by 3. The numbers of this class are contained under the formula $6n$ and stand in the sixth column.

The arrangement of the four classes of numbers in the double duodecimal table is as follows:

In the double duodecimal table the series 1, 1, 3 ... is arranged in twenty-four vertical columns. Twenty-four is an even multiple of 6; therefore, in the structure of this table all numbers of the same form with regard to 6 are denoted by the columns in which they stand.

The arrangement of the four classes of numbers in the duodecimal table is shown by lines connecting the columns containing the numbers of each class and by the formulæ under which they are contained on the margin of the table. See Fig. 2.

The divisibility of a number by 6 is indicated by the final sum of its digits. When the digits of any number are added, the final sum obtained will be either 2, 3, 4, 5, 6, 7, 8, 9 or 10. When a number is 1 more or 4 more than a multiple of 6, the final sum of the digits will be either 4, 7 or 10. When the number is 2 more or 5 more than a multiple of 6, the final sum of the digits will be either 2, 5 or 8. When a number is a multiple of 6 or 3 more than a multiple of 6, the final sum of the digits is either 3, 6, or 9. Hence, possible and impossible powers are indicated by the final sum of their digits. Thus, when the final sum of the digits is 4, 7, 9 or 10, the number is a possible power of any degree. When the final sum of the digits is 2, 5 or 8, the number is a possible odd power of any degree but cannot be a square. When the final sum of the digits is 3 or 6, the number cannot have an integral root. This property is seen in the multiplication of the formulæ.

*How to use the double duodecimal table in teaching the process of forming numbers out of their prime constants or "prime factors" as they are commonly called.*

In the drawing it will be observed that there are small figures beneath each number within the same unit square and these small figures illustrate the process of forming numbers out of their prime factors. The process of measuring and recording the multiples of prime numbers involves the following considerations.

Every composite number is a multiple of one or more prime numbers and is formed by using each of the prime numbers as a constant multiplier.

The successive numbers that are formed by using one prime number as a constant multiplier are the powers of the prime number.

The successive numbers that are formed by using two or more prime numbers as constant multipliers are the common multiples of the two or more prime numbers.

The process of forming numbers out of their prime constants is the general process of pure arithmetic, and when it is carried sufficiently far and fully analyzed, it will be seen to contain all the special processes which have their origin in the use of the prime numbers as constant multipliers, such as factoring, common multiples, common divisors, involution, evolution, progression, etc.

This process is my discovery and it is, therefore, necessary to explain the successive steps in the process before I can show how they are taught and illustrated.

The multiples of a prime number are distinguished by their forms with regard to the powers of the prime number, that is, by the number of times the prime constant is used in their formation. Thus, when the prime constant is used once, the number is a multiple of the prime number only; when it is used twice the number is a multiple of the square; when it is used three times the number is a multiple of the cube; and so on.

In the process of forming the multiples of a prime number, 1 is the first multiplicand; therefor, I write 1 under every number and within the same unit square. Then I measure the multiples of the successive powers of the successive prime numbers in the order in which they are formed from unity.

The successive steps in this process are as follows:

*The multiples of 2.*—The first prime number is 2. Taking 2 and every second number after 2, I have the multiples of 2: 2, 4, 6, 8, 10, etc.

The multiples of the powers of 2 are arranged as follows:

Every second multiple of 2 is a multiple of 4 (the square); every second multiple of 4 is a multiple of 8 (the cube); every second multiple of 8 is a multiple of 16 (the fourth power); every second multiple of 16 is a multiple of 32 (the fifth power); and so on.

Therefore, I write 2 after every second 1.
  4 after every second 2.
  8 after every second 4.
  16 after every second 8.
  32 after every second 16.
  64 after every second 32.
  128 after every second 64, and so on.

*The multiples of 3.*—The first number after 2 that is not measured by 2 is 3; therefore, 3 is the second prime number. Taking 3 and every third number after 3, I have the multiples of 3: 3, 6, 9, 12, 15, 18, 21, 27, etc.

In measuring the multiples of the powers of all other prime numbers which enter into the table, *i. e.*, 5, 7, 11 and the higher prime numbers I proceed in a similar manner.

When this is done, I have under every number and within the same unit square, the one or more prime constants of the number and the one or more powers of each prime constant, according to the number of times that prime constant is used in forming the number.

When a number has but one prime constant, I place the one or more powers of the prime constant in a horizontal line to the right of 1. Thus: 1, 2, 4.

When a number has two or more prime constants, I place the one or more powers of the first or smallest prime constant in a horizontal line to the right of 1, and the one or more powers of the one or more larger prime constants in a vertical line under 1, in the order of their magnitude:

Thus: 1, 2, 4.
3
9
5
25
7
11

When a number has two prime constants, I multiply the one or more powers of the first or smaller prime constant in succession by the one or more powers of the second prime constant in succession, and place the successive products formed by each multiplier in a horizontal line so they coincide with the multiplicands.

When a number has three prime constants, I multiply the products formed by the first and second prime constants in succession by the one or more powers of the third prime constant in succession, and place the successive products formed by each multiplier in parallel horizontal lines so they coincide with the multiplicands.

When a number has four prime constants, I multiply the products formed by the first, second and third prime constants in succession by the one or more powers of the fourth prime constant in succession, and place the successive products formed by each multiplier in parallel horizontal lines so that they coincide with the multiplicands.

When a number has five or more prime constants I proceed in a similar manner.

The numbers that have two or more prime constants are:

6, 10, 12, 14, 15, 18, 20, 21, 22, 24, 26, 28, 30, 33, 34, 36, 38, 39, 40, 42, 44, 45, 46, 48, 50, 51, 52, 54, 55, 56, 57, 58, 60, 62, 63, 64, 65, 66, 68, 69, 70, 72, 74, 75, 76, 77, 78, 80, 82, 84, 85, 86, 87, 88, 90, 91, 92, 93, 94, 95, 96, 98, 99, 100, etc.

I begin with 6 and take these numbers in succession, multiplying together the one or more powers of the two or more prime constants under each number before passing to the next. When this is done the divisors of every number stand under the number and within the same unit square. They are arranged in the order in which they are formed out of their prime constants. All divisors that are formed by using the smallest prime constant a given number of times stand in the same column, and all that are formed by using any larger prime constant a given number of times stand in the same row or rows, and hence, the number of times each prime constant is used in forming any divisor is indicated by the column and the row in which it stands.

The greatest common divisor of two or more numbers is the number formed by using each of their common prime constants the least number of times that it is used in any one of the numbers; therefore, it is indicated by the column and the row in which it stands.

The least common multiple of two or more numbers is the number formed by using each of their common prime constants the greatest number of times it is used in any one of the numbers; therefore, it is indicated by the column and the row in which it stands.

The square of a number is the number formed by using each of its prime constants twice the number of times it is used in the number; the cube is the number formed by using each of its prime constants three times the number of times it is used in the number; the fourth power is the number formed by using each of its prime constants four times the number of times it is used in the number; and so on; therefore, every power of the number is indicated by the row and the column in which it stands.

The square root of a number is the number formed by using each of its prime constants half as many times as it is used in the number; the cube root is the number formed by using each of its prime constants one-third the number of times it is used in the number; and so on. Therefore, the integral root of a perfect power is indicated by the row and the column in which it stands.

From the foregoing explanations, it will be seen that the process of forming the divisors of a number, the common divisor of two or more numbers, the least common multiple of two or more numbers, the powers of a number, the integral root of a perfect power, &c., are all contained in the general process of forming numbers out of their prime constants or "prime factors."

The divisors of every number are so written that the distance between the successive divisors in each horizontal row is the same as the distance between the successive divisors in each vertical column; therefore, the divisors of every number form either a horizontal line, a square or an oblong, according to the number of its prime constants and the number of times each prime constant is used.

When the number is a power of a prime number, its divisors form a horizontal line.

When a number is a common multiple of only two prime numbers and each prime constant is used the same number of times, there are as many horizontal rows as there are vertical columns and these form a square, while the divisors of every other number form an oblong. When there are more rows than columns, the oblong is horizontally disposed and when there are more columns than rows, the oblong is vertically disposed. Hence the different kinds of numbers can be distinguished at sight.

THE ARRANGEMENT OF COMPLEMENTARY DIVISORS.

The divisors of a number are arranged in pairs so proportioned that the product of each pair equals the number.

These pairs are determined by the laws of position, or by the laws of simple and compound geometrical progression, which are as follows:

When there is but one series of divisors, the product of the first and last divisor is equal to the product of any two divisors equally distant from them and to the square of the middle divisor when there is an odd number of divisors.

When there are two or more series of divisors, the product of the first divisor of the first series and the last divisor of the last series is equal to the product of any two divisors equally distant from them and to the square of the middle divisor when there is an odd number of divisors.

I call these pairs complementary divisors of the number.

In developing the laws of position, 1 and the number itself must be regarded as the first pair of complementary divisors. Every other pair stand either horizontally, vertically or diagonally opposite and equally distant from the first pair.

When a number is a square it has an odd number of divisors; and hence, a middle divisor which multiplied by itself equals the number. This middle divisor is the square root. Every divisor, except the square root, has its complementary divisor, which stands horizontally, vertically or diagonally opposite and equally distant from the square root.

When a number contains two series of divisors, every divisor of the first series has its complementary divisor in the second. When a number contains three series of divisors, every divisor of the first series has its complementary divisor in the third, and every divisor in the second series has its complementary divisor in the second. When the number contains four series of divisors, every divisor of the first series has its complementary divisor in the fourth, every divisor of the second series has its complementary divisor in the third; and so on.

Any two numbers having for their product a given number are complementary divisors of that number; hence, when the number is divided by either divisor the other will be quotient.

The arrangement of the complementary divisors of a number is shown by means of lines connecting each pair as in the following examples:

Complementary divisors of 16:

1 2 4 8 16

| Multiplication. | Division. |
|---|---|
| 1×16=16 | 16÷1=16 |
| 2× 8=16 | 16÷2= 8 |
| 4× 4=16 | 16÷8= 2 |
| 4× 4=16 | 16÷4= 4 |

Complementary divisors of 40:

1 2 4 8
5 10 20 40

| Multiplication | Division |
|---|---|
| 1×40=40 | 40÷1=40 |
| 2×20=40 | 40÷2=20 |
| 4×10=40 | 40÷4=10 |
| 8× 5=40 | 40÷8= 5 |

The complementary parts of a number may be shown by means of lines connecting each pair, as in the following illustrations:

Complementary parts of 3.

1 2 3    1+2=3

Complementary parts of 4.

1 2 3 4    1+3=4
           2+2=4

Complementary parts of 5.

1 2 3 4 5    1+4=5
             2+3=5

How I use the adjustable slate in teaching and illustrating the analysis of a number.

I write 1 2 3 in the first row, 1 2 3 4 in the second, 1 2 3 4 5 in the third, and so on. I connect the complementary parts of each successive number with lines and write each pair with the sign plus between them opposite the number.

In using my slate in teaching and illustrating the analysis of a number, I connect the complementary parts of each successive number with lines as shown in the above illustrations and I then, as also shown above, write each pair, with the sign plus between the numbers constituting the pair, opposite the number.

THE SUM OF TWO NUMBERS.

The sum of two numbers is the same in whichever order they are added.

*Illustrative examples.*

For brevity three dots ∴ are here used for the word therefore. Thus, 1+2=3∴ 2+1=3 is read 1 plus 2 equals 3, therefore, 2 plus 1 equal 3.

Complementary parts of 3.

1 2 3    1+2=3∴2+1=3

Complementary parts of 4.

1 2 3 4    1+3=4∴3+1=4

I show by the use of the balls that the sum of any two numbers is the same in whichever order they are added, and write each pair on the adjustable slate; thus, Complementary parts of 3.

```
1+2=3    0+00=000
2+1=3    00+0=000
```

Complementary parts of 4.

```
1+3=4    0+000=0000
3+1=4    000+0=0000
```

THE DIFFERENCE BETWEEN TWO NUMBERS.

Any two numbers whose sum is equal to a given number are complementary parts of that number. If the smaller number is 1, they are the first pair; if 2, they are the second pair; if 3, they are the third pair; and so on.

When one of the complementary parts is subtracted from the number, the other will be the remainder.

*Illustrated examples.*

Thus, $1+3=4 \therefore 4-1=3$ is read one plus three equals four; therefore, four minus 1 equals three.

Complementary parts of 3.

```
1 2 3    1+2=3∴3-2=1 and 3-1=2
|_|
```

Complementary parts of 4.

```
1 2 3 4    1+3=4∴4-3=1 and 4-1=3
|___|      2+2=4∴4-2=2
```

Complementary parts of 5.

```
1 2 3 4 5    1+4=5∴5-4=1 and 5-1=4
|_|_|_|      2+3=5∴5-3=2 and 5-2=3
```

I show by the use of the balls that when one of the complementary parts is subtracted from the number, the other will be the remainder, and write each pair on the adjustable slate; thus, Complementary parts of 3.

```
3-1=2    000-0=00
3-2=1    000-00=0
```

Complementary parts of 5.

```
5-1=4    00000-0=0000
5-4=1    00000-0000=0
5-2=3    00000-00=000
5-3=2    00000-000=00
```

PRINCIPLES.

1. The sum of two even numbers is even.
2. The sum of two odd numbers is even.
3. The sum of an odd number and an even number is odd.

Hence, if one of the complementary parts of an even number is even, the other must be even; if one is odd, the other must be odd.

If one of the complementary parts of an odd number is odd, the other must be even.

*Illustrative examples.*

An analysis of the numbers 6 and 7 amply serves to illustrate the complementary parts of even and odd numbers respectively and how in the use of my table these complementary parts are clearly comprehended and visualized.

Complementary parts of 6.

```
1 2 3 4 5 6    1 and 5 are odd.
|_|___|        2 and 4 are even.
```

Complementary parts of 7.

```
1 2 3 4 5 6 7    1 is odd.  6 is even.
|_|___|          2 is even. 5 is odd.
                 3 is odd.  4 is even.
```

I show by the use of the unit balls that the sum of two even numbers is even, the sum of two odd numbers is even and the sum of an odd number and an even number is odd, and write the illustrations on the adjustable slate; thus, Complementary parts of 6.

```
1+5=6    0+00000=000000
2+4=6    00+0000=000000
```

Complementary parts of 7.

```
1+6=7    0+000000=0000000
2+5=7    00+00000=0000000
3+4=7    000+0000=0000000
```

*How I use the double duodecimal table in teaching the multiplication and division tables.*

When the numbers 1, 2, 3, etc., are each multiplied by the same number, the successive products are called a multiplication table.

When the multiplier is 2, the successive products are the multiples of 2 and the table is called the "two times table;" when the multiplier is 3, the successive products are the multiples of 3 and the table is called the "three times table;" and so on.

The divisors of 24 are 2, 3, 4, 6, 8, 12, 24. Taking these divisors in the order in which they are formed out of the prime constants 2 and 3, we have 2, 4, 8, a geometrical series of three numbers, and 3, 6, 12, 24, a geometrical series of four numbers.

Every second multiple of 2 is a multiple of 4; every second multiple of 4 is a multiple of 8.

Every second multiple of 3 is a multiple of 6; every second multiple of 6 is a multiple of 12; every second multiple of 12 is a multiple of 24.

These seven multiplication tables are taught in the order in which they are formed out of their prime constants 2 and 3. First, the two times, four times and eight times tables; then, the three times, six times, twelve times and twenty-four times tables.

The successive products in each table are measured by the unit balls and written on the adjustable slate.

*The two times table.*—I move the unit balls, two at a time, to the left, saying 2 times 1 are 2, 2 times 2 are 4, 2 times 3 are 6, and so on. I write the first product (2) under the second ball, the second product (4) under the fourth ball, the third product (6) under the sixth ball; and so on.

2 is contained in 24 twelve times; therefore, the multiples of 2 stand in twelve columns, viz., 2d, 4th, 6th, 8th, 10th, 12th, 14th, 16th, 18th, 20th, 22d and 24th.

*The four times table.*—I move the unit balls four at a time to the left, saying 4 times 1 are 4, 4 times 2 are 8, 4 times 3 are 12, and so on. I write the first product (4) under the fourth ball, the second product (8) under the eighth ball, the third product (12) under the twelfth ball; and so on.

4 is contained in 24 six times; therefore, the multiples of 4 stand in six columns, viz., 4th, 8th, 12th, 16th, 20th and 24th.

I proceed in a similar manner with respect to the eight times table, the three times table, the six times table and the twelve times table, moving the unit balls as many at a time as are indicated by the table employed.

When the unit balls in each row are all moved to the left as far as possible, the arrangement of the columns containing the products in each of these multiplication tables is vividly pictured in contrasting colors and the products in each of these tables stand in parallel vertical columns.

When a number is an odd multiple of 2, the two right hand balls are either red, yellow or orange, and when it is an even multiple of 2, the two right hand balls are either blue, purple or green.

The odd multiples of 2 are the numbers in the 2d, 6th, 10th, 14th, 18th and 22d columns. The even multiples of 2 are the numbers in the 4th, 8th, 12th, 16th, 20th and 24th columns. The even multiples of 2 are the multiples of 4.

The odd multiples of 4 are the numbers in the 4th, 12th and 20th columns. The even multiples of 4 are the numbers in the 8th, 16th and 24th columns. The even multiples of 4 are the multiples of 8.

The multiples of 8 are the numbers in the 8th, 16th and 24th columns. In 24 (the base of the double-duodenary table) 8 is contained an odd number of times; therefore, the odd and even multiples of 8 are not distinguished by the columns in which they stand but are all contained in the 8th, 16th and 24th columns.

The odd multiples of 3 are the numbers in the 3d, 9th, 13th and 21st columns. The even multiples of 3 are the numbers in the 6th, 12th, 18th and 24th columns. The even multiples of 3 are the multiples of 6.

When a number is an odd multiple of 6, the two right hand balls are yellow, and when it is an even multiple of 6, the two right hand balls are green.

The odd multiples of 6 are the numbers in the 6th and 18th columns. The even multiples of 6 are the numbers in the 12th and 24th columns. The even multiples of 6 are the multiples of 12.

The multiples of 12 are the numbers in the 12th and 24th columns. The odd multiples of 12 are the numbers in the 12th column. The even multiples of 12 are the numbers in the 24th column. The even multiples of 12 are the multiples of 24. When a number is a multiple of 12 or 24, the two right hand balls are green.

The following diagrams show how the unit balls are arranged in measuring the successive products in each of these multiplication tables, and how each successive addend is pictured in contrasting colors. The colors are designated by RR (red), BB (blue), YY (yellow), PP (purple), OO (orange), GG (green).

*The 2 times table.*

```
RR BB YY PP OO GG RR BB YY PP OO GG
OO OO OO OO OO OO OO OO OO OO OO OO
OO OO OO OO OO OO OO OO OO OO OO OO
OO OO OO OO OO OO OO OO OO OO OO OO
OO OO OO OO OO OO OO OO OO OO OO OO
OO OO OO OO OO OO OO OO OO OO OO OO
OO OO OO OO OO OO OO OO OO OO OO OO
```

*The 4 times table.*

```
RRBB   YYPP   OOGG   RRBB   YYPP   OOGG
OOOO   OOOO   OOOO   OOOO   OOOO   OOOO
OOOO   OOOO   OOOO   OOOO   OOOO   OOOO
OOOO   OOOO   OOOO   OOOO   OOOO   OOOO
OOOO   OOOO   OOOO   OOOO   OOOO   OOOO
OOOO   OOOO   OOOO   OOOO   OOOO   OOOO
OOOO   OOOO   OOOO   OOOO   OOOO   OOOO
```

*The 8 times table.*

```
RRBBYYPP    OOGGRRBB    YYPPOOGG
OOOOOOOO    OOOOOOOO    OOOOOOOO
OOOOOOOO    OOOOOOOO    OOOOOOOO
OOOOOOOO    OOOOOOOO    OOOOOOOO
OOOOOOOO    OOOOOOOO    OOOOOOOO
OOOOOOOO    OOOOOOOO    OOOOOOOO
OOOOOOOO    OOOOOOOO    OOOOOOOO
```

*The 3 times table.*

```
RRB  BYY  PPO  OGG  RRB  BYY  PPO  OGG
OOO  OOO  OOO  OOO  OOO  OOO  OOO  OOO
OOO  OOO  OOO  OOO  OOO  OOO  OOO  OOO
OOO  OOO  OOO  OOO  OOO  OOO  OOO  OOO
OOO  OOO  OOO  OOO  OOO  OOO  OOO  OOO
OOO  OOO  OOO  OOO  OOO  OOO  OOO  OOO
OOO  OOO  OOO  OOO  OOO  OOO  OOO  OOO
```

*The 6 times table.*

```
RRBBYY    PPOOGG    RRBBYY    PPOOGG
OOOOOO    OOOOOO    OOOOOO    OOOOOO
OOOOOO    OOOOOO    OOOOOO    OOOOOO
OOOOOO    OOOOOO    OOOOOO    OOOOOO
OOOOOO    OOOOOO    OOOOOO    OOOOOO
OOOOOO    OOOOOO    OOOOOO    OOOOOO
OOOOOO    OOOOOO    OOOOOO    OOOOOO
```

*The 12 times table.*

```
RRBBYYPPOOGG        RRBBYYPPOOGG
OOOOOOOOOOOO        OOOOOOOOOOOO
OOOOOOOOOOOO        OOOOOOOOOOOO
OOOOOOOOOOOO        OOOOOOOOOOOO
OOOOOOOOOOOO        OOOOOOOOOOOO
OOOOOOOOOOOO        OOOOOOOOOOOO
OOOOOOOOOOOO        OOOOOOOOOOOO
```

The numbers 5, 7, 9, 10 and 11 are not exact divisors of 24; therefore in the structure of the double-duodecimal table the products in these tables are not arranged in columns but form parallel diagonal rows which cross the duodecimal table from left to right. The arrangement of the successive products in any one of these multiplication tables is vividly shown when a kindergarten peg is inserted under each product.

The successive products in every multiplication table from an arithmetical progression; hence, the sum of the first and third products is equal to twice the second or middle product; the sum of the first and fourth products is equal to the sum of the second and third products; the sum of the first and fifth products is equal to the sum of the second and fourth products and equal to double the third or middle product; and so on.

I show the arrangement of these pairs by connecting the extremes and the means with lines. I write the sum and the difference of each pair on the adjustable slate, and show their relative magnitude by the use of the unit balls, as in the following illustration.

*The two times table:*—The successive products in the two times table form an arithmetical progression in which the common difference is 2, viz.: 2, 4, 6, 8, 10, 12, 14, 16, 18, 20, 22, 24. I move the unit balls, two at a time, to the left, repeating the products and the common difference; thus, 2 and 2 are 4, 4 and 2 are 6, 6 and 2 are 8, 8 and 2 are 10, 10 and 2 are 12, 12 and 2 are 14, 14 and 2 are 16, 16 and 2 are 18, 18 and 2 are 20, 20 and 2 are 22, 22 and 2 are 24.

*The combinations.*—

```
2  4  6            2+ 6= 8      8—2= 6 and 8— 6=2
|_____|            4+ 4= 8      8—4= 4

2  4  6  8         2+ 8=10     10—2= 8 and 10— 8=2
|_____|         4+ 6=10     10—4= 6 and 10— 6=4

2  4  6  8  10     2+10=12     12—2=10 and 12—10=2
|_____|      4+ 8=12     12—4= 8 and 12— 8=4
                   6+ 6=12     12—6= 6
```

HOW KINDERGARTEN PEGS ARE USED IN FINDING PRIME NUMBERS.

Every prime number greater than 3 is 1 more or 1 less than a multiple of 6. Since the multiples of 6 stand in the 6th, 12th, 18th and 24th columns, every prime number greater than 3 must stand in the 1st, 5th, 7th, 11th, 13th, 17th, 19th or 23rd column.

On one side of the frame A there is a hole *a* in each unit square, and in these holes I insert kindergarten pegs whenever desired in illustrating the principles of arithmetic.

In finding prime numbers I insert a peg *p* in the hole under the prime number 2 and write 2 under every second number after 2.

When this is done, the first number after 2 that is not marked 2 is 3; therefore 3 is a prime number.

I insert a peg in the hole under the prime number 3, and write 3 under every third number after 3. When this is done, the first number after 3 that is not marked 2 or 3 is 5; therefore 5 is a prime number.

I insert a peg in the hole under the prime number 5, and write 5 under every fifth number after 5. When this is done, the first number after 5 that is not marked 2, 3 or 5 is 7; therefore 7 is a prime number.

I insert a peg in the hole under the prime number 7, and write 7 under every seventh number after 7. When this is done, the first number after 7 that is not marked 2, 3, 5 or 7 is 11; therefore 11 is a prime number.

I proceed in a similar manner in showing the arrangement of the larger prime numbers and their multiples.

Before beginning this process, I move all the balls to the left as far as possible. The peg under every prime number is the same color as the right hand ball of the prime number. Thus, I place a red peg under 2 and under 13; a yellow peg under 5 and under 17; a purple peg under 7 and under 19; a green peg under 11 and under 23; and so on.

*Fractional parts.*

Fractional parts are illustrated with the unit balls and written on the blank squares of the adjustable table.

Thus, move up six balls and every ball represents one-sixth of 6. Divide the balls into groups of 2's and every group represents one-third of 6. Divide the balls into groups of 3's and every group represents one-half of 6.

On the first row show the sixths.
On the second row show the halves.
On the third row show the thirds. Thus,

```
Whole    O  O  O  O  O  O
Halves   O  O  O  O  O  O
         |__|  |__|  |__|
Thirds   O  O  O  O  O  O
         |____| |____| |____|
```

Picture all the fractional parts at the same time so they can be measured and compared.

What part of 6 is 1?
What part of 6 is 2?
What part of 6 is 3?
What part of 6 is 4?
What part of 6 is 5?

Write the fractional parts in the blank squares.

1. ⅙ of 6.      4. ⅔ of 6.
2. ⅔ of 6.      5. ⅚ of 6.
3. ½ of 6.

Show by the use of the balls that two-thirds is equal to four-sixths; thus

```
O  O  O  O  O  O   Two-thirds.
|__|  |__|
O  O  O  O  O  O   Four-sixths.
|_____|  |_____|
```

Show by representing the fraction with lines that two-thirds is equal to fourth-sixths.

```
 __   __   __   __     Two-thirds.
|__| |__|
 __   __   __   __     Four-sixths.
|_____|
```

Having illustrated and described my invention thus fully, and suitable means by which the same may be put into practice, I wish it to be understood that I do not limit myself to the specific construction or materials selected for illustration and description, nor in general do I limit myself otherwise than as set forth in the claims read in connection with this specification.

What I claim as new and desire to secure by Letters Patent is:—

1. A number table provided with balls of standard colors arranged to show the forms of all numbers with regard to the radix 24 and with regard to each divisor of said radix.

2. A number table provided with balls of standard colors arranged to show the forms of all numbers with regard to the radix 24 and with regard to each divisor of said radix, the arrangement of these balls forming a vivid picture of all the parts of every number whether addends or divisors which can be seen without moving the balls.

3. A number table provided with balls of standard colors arranged to show the forms of all numbers with regard to the radix 24 and with regard to each divisor of said radix, the arrangement of these balls forming a vivid picture of all the parts of every number whether addends or divisors which can be seen without moving the balls, said number table being provided with a surface ruled in squares.

4. A number table provided with balls of standard colors arranged to show the forms of all numbers with regard to the radix 24 and with regard to each divisor of said radix, the arrangement of these balls forming a vivid picture of all the parts of every number whether addends or divisors which can be seen without moving the balls, said number table being provided with a surface ruled in squares, the side of the square and the diameter of the ball serving as a linear unit in measuring, comparing, combining and separating numbers.

5. A number table provided with balls of standard colors arranged to show the forms of all numbers with regard to the radix 24 and with regard to each divisor of said radix, the arrangement of these balls forming a vivid picture of all the parts of every number whether addends or divisors which can be seen without moving the balls, said number table being provided with a surface ruled in squares, the side of the square and the diameter of the ball serving as a linear unit in measuring, comparing, combining and separating numbers, said surface being provided with holes for receiving pegs of standard colors.

6. Apparatus for demonstrating the principles of arithmetic, said apparatus comprising a frame with a series of supporting members each having a set of movable counters, and frame members having indicia of the numerical relationships appertaining to said counters in predetermined relative positions, said indicia including sockets and vari-colored pegs for insertion in said sockets to accentuate said numerical relationships.

Signed at New York in the county of New York and State of New York, this eighteenth day of April, 1918.

FRANCES AYRES RODDY.

Witnesses:
 ALEX. C. PROUDFIT,
 GEO. H. CONGER.